UNITED STATES PATENT OFFICE.

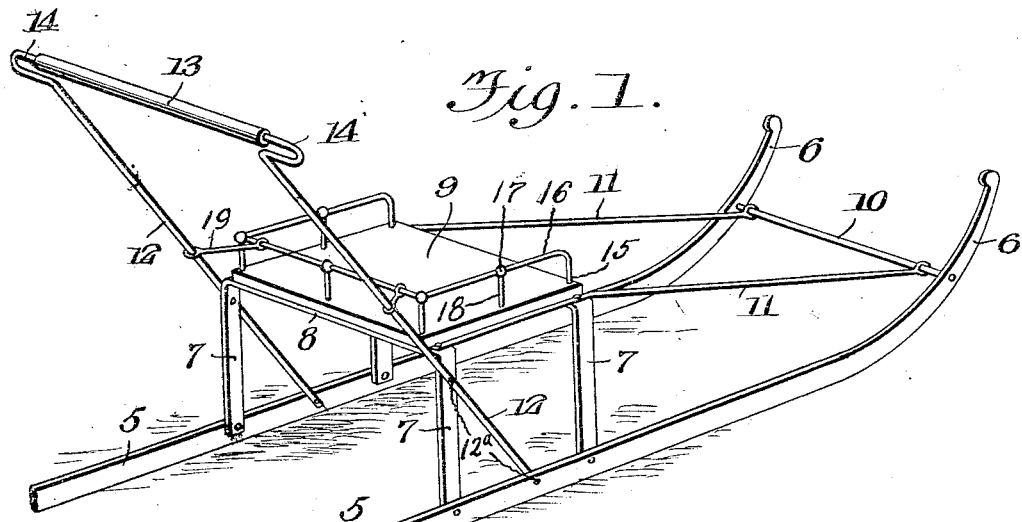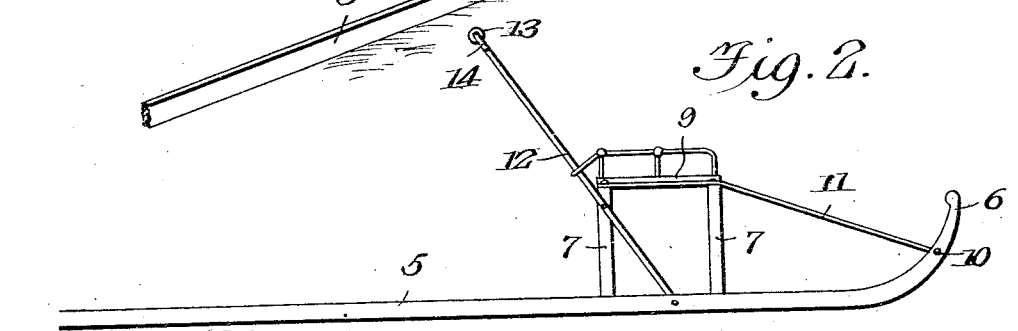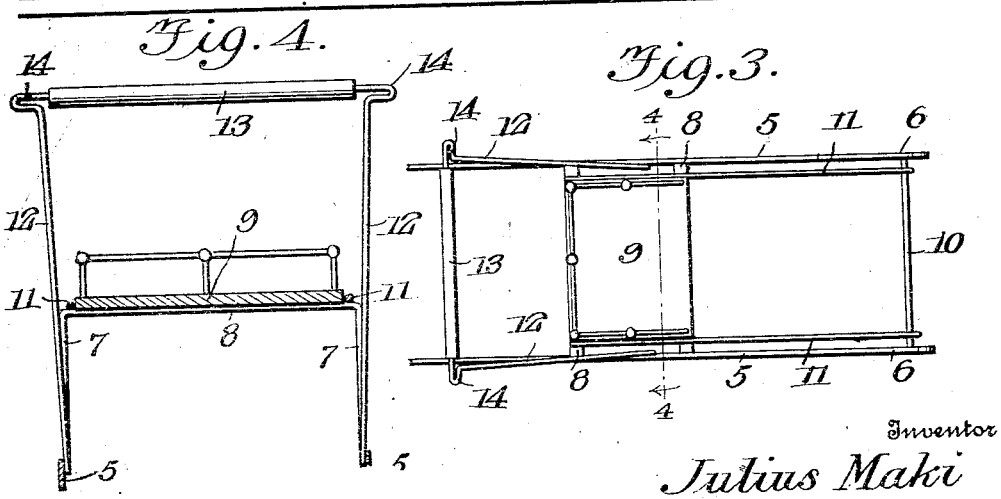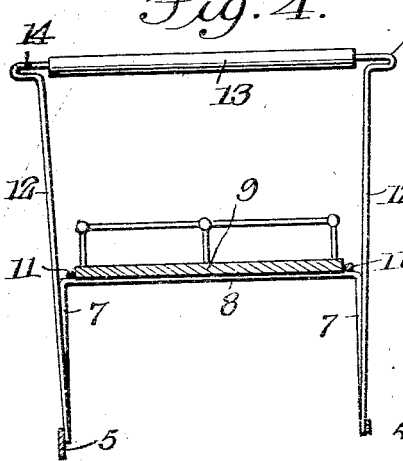

JULIUS MAKI, OF CHICAGO, ILLINOIS.

SLED.

1,150,378.

Specification of Letters Patent.   Patented Aug. 17, 1915.

Application filed May 6, 1914.   Serial No. 837,265.

*To all whom it may concern:*

Be it known that I, JULIUS MAKI, a citizen of the United States, residing at Chicago, in the county of Cook and State of Illinois, have invented new and useful Improvements in Sleds, of which the following is a specification.

The invention relates to a sled, and more particularly to the class of kicking sleds.

The primary object of the invention is the provision of a sled wherein the same can be readily and easily guided when traveling upon snow or ice with the rider standing on one runner or another person occupying the seat.

Another object of the invention is the provision of a sled wherein the frame is rendered strong to insure durability.

A further object of the invention is the provision of a sled which is simple in construction, strong, durable, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a perspective view of a sled constructed in accordance with the invention. Fig. 2 is a side view thereof. Fig. 3 is a top plan view. Fig. 4 is a sectional view on the line 4—4 of Fig. 3.

Similar reference characters indicate corresponding parts throughout the several views in the drawing.

Referring to the drawing in detail, the sled comprises spaced duplicate runners 5, preferably made from flat steel bars with their narrower sides or edges forming the shoes, the forward ends 6 of the runners being upwardly curved as usual for riding over obstructions or uneven surfaces so as not to impede the travel of the sled.

Riveted or otherwise fixed to the runners 5 spaced from the front ends are the vertical limbs or legs 7 of inverted U-shaped frames 8 which are made from flat steel bars to provide supports for a seat 9 mounted thereon.

Secured in the upwardly curved ends 6 of the runners 5 is a cross rung 10 to which are connected truss wires 11, the same being connected in any suitable manner to the forward frame supporting the seat 9, and in this manner the sled is rendered more rigid to withstand shocks and jars incident to the travel thereof.

Connected to the runners 5 and the vertical limbs of the rearmost frame 8 are forwardly inclined side members 12 secured to the sled body at $12^a$ of a handle bar 13, the members 12 contiguous to the handle bar being outwardly curved at 14 so as to enable the gripping of the ends of the handle bar 13 when guiding the sled on twisting the said handle bar or exerting lateral pressure thereon while the rider has one foot on one runner and is kicking the surface with the other foot to advance the sled.

Secured to the front edge of the seat 9 are the down-turned ends 15 of a guard rail 16 which extends about the sides and rear of the said seat at a slight distance elevated therefrom, the said rail being passed through eyes 17 formed in the upper ends of supports or wire-like posts 18 fixed in the seat 9 at intervals throughout the side and rear thereof, while connected to the rear portion of the rail are tie wires 19 which are also connected to the side members 12 of the handle bar 13, thus bracing the same. This guard rail serves to hold packages on the seat 9 when the sled is in motion, and is propelled by a person standing on one of the runners 5 thereof, as hereinbefore set forth.

From the foregoing it is thought that the construction and manner of use of the device will be clearly understood, and therefore a more extended explanation has been omitted.

What is claimed is:—

A sled comprising a pair of runners, a frame composed of a pair of U-shaped members having their free extremities secured to said runners, a seat positioned on said frame, a rod bent intermediate its ends to form a handle, and a pair of side members, each of said side members being a continuation of said handle, rivets securing said side members to said frame and runners so as to lie at an angle thereto and truss bars secured at the front extremities to the front portion of said runners and at their rear extremities to said frame at a point approximately in alinement with the rivets which secure said side members to said frame.

In testimony whereof I affix my signature in presence of two witnesses.

JULIUS MAKI.

Witnesses:
 HERMAN MAKELA,
 ELI NIEMI.